(12) United States Patent
Teague et al.

(10) Patent No.: US 8,744,465 B2
(45) Date of Patent: Jun. 3, 2014

(54) RESOURCE ALLOCATION METHOD IN A COMMUNICATION SYSTEM

(75) Inventors: Edward Harrison Teague, San Diego, CA (US); Fatih Ulupinar, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1182 days.

(21) Appl. No.: 11/449,946

(22) Filed: Jun. 9, 2006

(65) Prior Publication Data

US 2006/0291393 A1 Dec. 28, 2006

Related U.S. Application Data

(60) Provisional application No. 60/691,433, filed on Jun. 16, 2005.

(51) Int. Cl.
*H04W 72/00* (2009.01)

(52) U.S. Cl.
USPC ........ 455/451; 455/450; 455/452.2; 455/464; 455/67.11; 455/509; 370/329; 370/338; 375/260

(58) Field of Classification Search
USPC ........................ 370/330, 338, 348; 455/452.1, 455/450–453, 509, 512, 513, 67.11
See application file for complete search history.

(56) References Cited

U.S. PATENT DOCUMENTS

| | | | |
|---|---|---|---|
| 4,542,380 A * | 9/1985 | Beckner et al. ............... | 370/300 |
| 5,513,379 A * | 4/1996 | Benveniste et al. ........... | 455/451 |
| 5,557,608 A | 9/1996 | Calvignac et al. | |
| 5,678,188 A | 10/1997 | Hisamura | |
| 5,966,664 A | 10/1999 | Hiramatsu et al. | |
| 6,201,966 B1 * | 3/2001 | Rinne et al. .................... | 455/434 |
| 6,256,356 B1 * | 7/2001 | Suzuki .......................... | 375/260 |
| 6,418,148 B1 * | 7/2002 | Kumar et al. ................. | 370/468 |
| 6,594,249 B1 * | 7/2003 | Goldberg ...................... | 370/345 |

(Continued)

FOREIGN PATENT DOCUMENTS

| | | |
|---|---|---|
| EP | 1128612 | 8/2001 |
| JP | 60500195 | 2/1985 |

(Continued)

OTHER PUBLICATIONS

International Search Report—PCT/US2006/023170—European Patent Office—May 31, 2007.

(Continued)

*Primary Examiner* — Sharad Rampuria
(74) *Attorney, Agent, or Firm* — Howard Seo

(57) ABSTRACT

Systems and methodologies are described that facilitate resolving resource assignment conflicts between access terminals in a wireless communication environment. A first access terminal may receive a persistent, or "sticky" assignment of a set of resources, such as subcarriers. In the event that a second access terminal requires a brief resource assignment, a time-limited, or "non-sticky" resource assignment may be granted to the second access terminal. If a resource in the non-sticky assignment is already assigned to the first access terminal via the sticky assignment, the first access terminal may receive an indication of the conflict along with information related to a duration of the non-sticky assignment, may surrender the conflicted resource, and may resume control over the conflicted resource after the termination of the non-sticky assignment.

51 Claims, 11 Drawing Sheets

(56) References Cited

U.S. PATENT DOCUMENTS

| | | | |
|---|---|---|---|
| 6,657,982 B1* | 12/2003 | Fong et al. | 370/336 |
| 6,804,520 B1* | 10/2004 | Johansson et al. | 455/450 |
| 7,099,681 B2* | 8/2006 | O'Neill | 455/512 |
| 7,366,518 B2* | 4/2008 | Balogh et al. | 455/450 |
| 7,864,740 B2* | 1/2011 | Yang et al. | 370/337 |
| 8,095,141 B2* | 1/2012 | Teague | 455/452.1 |
| 8,223,707 B2* | 7/2012 | Tayloe et al. | 370/329 |
| 8,254,941 B2* | 8/2012 | Jung et al. | 455/450 |
| 2002/0093965 A1* | 7/2002 | Ageby et al. | 370/400 |
| 2003/0037146 A1* | 2/2003 | O'Neill | 709/226 |
| 2004/0082356 A1* | 4/2004 | Walton et al. | 455/522 |
| 2006/0036518 A1* | 2/2006 | O'Neill | 705/30 |
| 2006/0268786 A1* | 11/2006 | Das et al. | 370/335 |
| 2006/0293076 A1* | 12/2006 | Julian et al. | 455/522 |
| 2007/0019596 A1* | 1/2007 | Barriac et al. | 370/338 |
| 2007/0211668 A1* | 9/2007 | Agrawal et al. | 370/335 |
| 2009/0233614 A1* | 9/2009 | Sousa et al. | 455/450 |
| 2011/0249644 A1* | 10/2011 | Boariu et al. | 370/329 |

FOREIGN PATENT DOCUMENTS

| | | |
|---|---|---|
| JP | H0787569 A | 3/1995 |
| JP | 2002305505 | 10/2002 |
| JP | 2002341748 | 11/2002 |
| JP | 2003338822 A | 11/2003 |
| RU | 2002132893 | 4/2004 |
| TW | 200425754 | 11/2004 |
| TW | 200507564 | 2/2005 |
| WO | 8402628 A1 | 7/1984 |
| WO | WO9848581 A1 | 10/1998 |
| WO | WO0030378 | 5/2000 |
| WO | WO0141343 | 6/2001 |
| WO | WO0186992 | 11/2001 |
| WO | WO0237887 | 5/2002 |
| WO | WO0241528 | 5/2002 |
| WO | WO03017522 | 2/2003 |
| WO | WO2004016007 | 2/2004 |

OTHER PUBLICATIONS

Tawianese Search Report—095121752, TIPO—Aug. 5, 2009.

Written Opinion—PCT/US2006/023170—European Patent Office, Munich—May 31, 2007.

European Search Report—EP11170810—Search Authority—Munich—Jan. 27, 2012.

* cited by examiner

RESOURCE ALLOCATION METHOD IN A COMMUNICATION SYSTEM

CLAIM OF PRIORITY UNDER 35 U.S.C. §119

This application claims the benefit of U.S. Provisional Application Ser. No. 60/691,433, entitled "A METHOD OF RESOURCE A COMMUNICATION SYSTEM," filed on Jun. 16, 2005, and assigned to the assignee hereof and hereby expressly incorporated by reference herein.

BACKGROUND

I. Field

The following description relates generally to wireless communications, and more particularly to reducing interference in a wireless communication environment.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a user device. A user device within the coverage area of such base station can be employed to receive one, more than one, or all the data streams carried by the composite stream. Likewise, a user device can transmit data to the base station or another user device.

Base stations may schedule reverse link communications transferred from user devices to base stations. For instance, when employing Orthogonal Frequency Division Multiplexing (OFDM), the base station may effectuate scheduling decisions (e.g., allocate resources such as time, frequency, power, etc. to one or more user devices) pertaining to reverse link communications, and thus, the base station may facilitate maintaining orthogonality. However, conventional techniques for providing scheduling information from the user device(s) to the base station(s) may be inefficient, time-consuming and difficult.

Therefore, a need exists in the art for systems and methods that facilitate allocating resources in a wireless communication environment in order to improve system throughput and enhance user experience.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to various aspects, conflicting resource assignments may be resolved by informing access terminal(s) of a non-sticky resource assignment that conflicts with a sticky assignment of one or more resources to the access terminal(s). A "non-sticky" assignment is a type of assignment that is limited in duration, where the duration is signaled with the assignment. A "sticky" assignment is a type of assignment that has an unlimited duration in time. Sticky and non-sticky assignments may be utilized to assign resources to access terminals fur utilization on either or both of a forward link and a reverse link.

According to an aspect, a method of resolving resource assignment conflicts between access terminals in a wireless communication environment, may comprise: receiving, at a first access terminal, an indication of a non-sticky assignment of resources to at least a second access terminal, the non-sticky assignment comprising at least one conflicted resource that is also assigned to the first access terminal via a sticky assignment; surrendering the conflicted resource at the first access terminal for a predetermined time period; and resuming the at least one conflicted resource after the predetermined time period has expired. A signal comprising a non-sticky assignment indication may also comprise information associated with a duration of the non-sticky assignment. The method may further comprise employing a wraparound protocol to resume the at least one conflicted resource as though the non-sticky assignment did not occur. For instance, a signal that enables or disables the wraparound protocol may be received, wherein the signal is based at least in part on at least one of a dynamic per-assignment parameter and a static system-wide parameter. Additionally or alternatively, the method may comprise employing a blanking protocol to resume at least one conflicted resource on a next logical resource after the non-sticky assignment has expired. For example, a signal that enables or disables the blanking protocol may be received, wherein the signal is based at least in part on at least one of a dynamic per-assignment parameter and a static system-wide parameter. Assigned resources may be utilized for forward link communication and/or for reverse link communication. The non-sticky assignment may be a broadcast assignment that is directed to a plurality of access terminals, wherein the broadcast assignment is indicated by a media access channel (MAC) identification and is utilized to receive at least one of a paging message, an overhead message, and a configuration message. Resources may comprise, without being limited to, frequencies, subcarriers, channels, tones, transmission symbols, or any combination thereof, etc.

According to another aspect, an apparatus that facilitates resolving resource assignment conflicts between access terminals in a wireless communication environment may comprise: a receiver at a first access terminal that receives a non-sticky assignment indicator signal comprising information related to resources assigned to at least a second access terminal, the non-sticky assignment comprising at least one conflicted resource that is also assigned to the first access terminal via a sticky assignment; and a processor that relinquishes control over the conflicted resource at the first access terminal for a predetermined time period, and resumes control over the at least one conflicted resource after the predetermined time period has expired. The non-sticky assignment indicator signal may also comprise information associated with a duration of the non-sticky assignment. The processor may employ a wraparound protocol to resume the at least one conflicted resource as though the non-sticky assignment did not occur. Additionally or alternatively, the processor may employ a blanking protocol to resume at least one conflicted resource on a next logical resource after the non-sticky assignment has expired. The receiver may receive a signal that enables or disables the protocol, whether wraparound or blanking, wherein the signal is based at least in part on at least one of a dynamic per-assignment parameter and a static system-wide parameter. Assigned resources may be utilized for forward or reverse link communication. The non-sticky assignment may be a broadcast assignment that is directed to a plurality of access terminals, and wherein the broadcast assignment is indicated by a media access channel (MAC) identification and is utilized to receive at least one of a paging message, an overhead message, and a configuration message.

According to still another aspect, an apparatus that facilitates resolving resource assignment conflicts between access terminals in a wireless communication environment may comprise: means for receiving an indication, at a first access terminal, of a non-sticky assignment of resources to at least a second access terminal, the non-sticky assignment comprising at least one conflicted resource that is also assigned to the first access terminal via a sticky assignment; means for surrendering the conflicted resource at the first access terminal for a predetermined time period; and means for resuming the at least one conflicted resource after the predetermined time period has expired. A signal comprising a non-sticky assignment indication may also comprise information associated with a duration of the non-sticky assignment. The apparatus may further comprise means for employing a wraparound protocol to resume the at least one conflicted resource as though the non-sticky assignment did not occur, and/or means for employing a blanking protocol to resume at least one conflicted resource on a next logical resource after the non-sticky assignment has expired. The means for receiving may receive a signal that enables or disables the blanking protocol, wherein the signal is based at least in part on at least one of a dynamic per-assignment parameter and a static system-wide parameter. Assigned resources may be utilized for forward link and/or reverse link communication, and a non-sticky assignment may be a broadcast assignment that is directed to a plurality of access terminals, and wherein the broadcast assignment is indicated by a media access channel (MAC) identification and is utilized to receive at least one of a paging message, an overhead message, and a configuration message.

Yet another aspect relates to a computer-readable medium having stored thereon computer-executable instructions for: receiving an indication, at a first access terminal, of a non-sticky assignment of resources to at least a second access terminal, the non-sticky assignment comprising at least one conflicted resource that is also assigned to the first access terminal via a sticky assignment; relinquishing control of the conflicted resource at the first access terminal for a predetermined time period; and resuming control of the at least one conflicted resource after the predetermined time period has ended. A signal comprising a non-sticky assignment indication also comprises information associated with a duration of the non-sticky assignment. The computer-readable medium may further comprise instructions for employing a wraparound protocol and/or a blanking to resume the at least one conflicted resource as though the non-sticky assignment did not occur, as well as instructions for analyzing a signal that enables or disables the wraparound and/or blanking protocol, wherein the signal is based at least in part on at least one of a dynamic per-assignment parameter and a static system-wide parameter. Assigned resources may be utilized for forward or reverse link communication. Additionally, the non-sticky assignment is a broadcast assignment that is directed to a plurality of access terminals, and wherein the broadcast assignment is indicated by a media access channel (MAC) identification and is utilized to receive at least one of a paging message, an overhead message, and a configuration message.

According to still another aspect, processor that executes computer-executable instructions for resolving conflicts between resource assignments in a wireless communication environment may execute instructions comprising: receiving an indication, at a first access terminal, of a non-sticky assignment of resources to at least a second access terminal, the non-sticky assignment comprising at least one conflicted resource that is also assigned to the first access terminal via a sticky assignment; relinquishing control of the conflicted resource at the first access terminal for a predetermined time period; and resuming control of the at least one conflicted resource after the predetermined time period has ended. A non-sticky assignment indication signal may also comprise information associated with a duration of the non-sticky assignment. The instructions further may further comprise employing a wraparound protocol and/or a blanking protocol to resume the at least one conflicted resource as though the non-sticky assignment did not occur, as well as analyzing a signal that enables or disables the wraparound protocol and/or the blanking protocol, wherein the signal is based at least in part on at least one of a dynamic per-assignment parameter and a static system-wide parameter. Assigned resources may be utilized for forward link and/or reverse link communication. Moreover, the non-sticky assignment may a broadcast assignment that is directed to a plurality of access terminals, and wherein the broadcast assignment is indicated by a media access channel (MAC) ID and is utilized to receive at least one of a paging message, an overhead message, and a configuration message.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
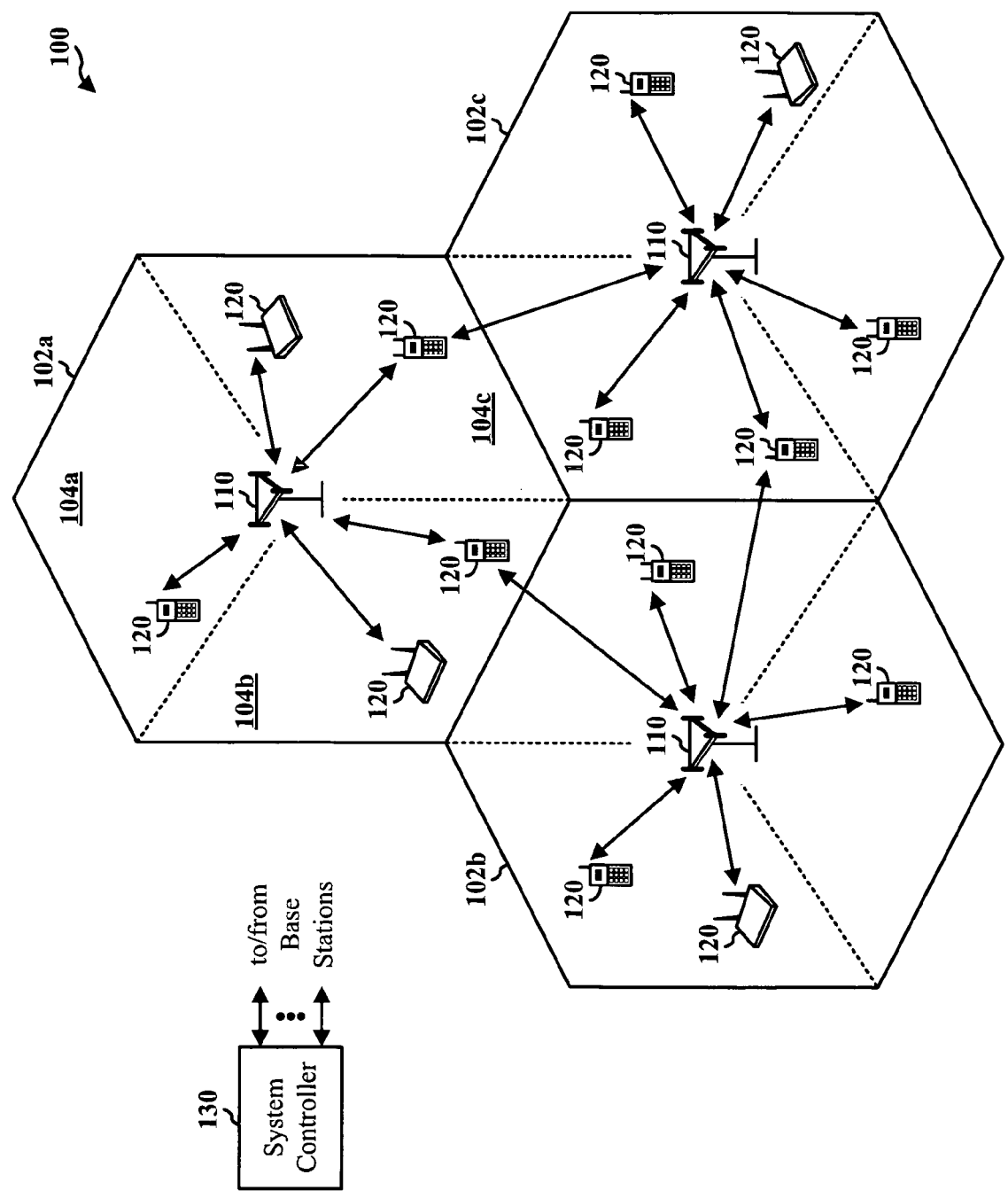
FIG. 1 illustrates a wireless communication system with multiple base stations and multiple terminals, in accordance with one or more aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a subscriber station. A subscriber station can also be called a system, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. It will be appreciated that the word "exemplary" is used herein to mean "serving as an example, instance, or illustration." Any embodiment or design described herein as "exemplary" is not necessarily to be construed as preferred or advantageous over other embodiments or designs.

FIG. 1 illustrates a wireless communication system 100 with multiple base stations 110 and multiple terminals 120, which may be employed in conjunction with one or more aspects described herein. A base station is generally a fixed station that communicates with the terminals and may also be called an access point, a Node B, or some other terminology. Each base station 110 provides communication coverage for a particular geographic area 102. The term "cell" can refer to a base station and/or its coverage area depending on the context in which the term is used. To improve system capacity, a base station coverage area may be partitioned into multiple smaller areas (e.g., three smaller areas), according to FIG. 1, 104a, 104b, and 104c. Each smaller area may be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 120 are typically dispersed throughout the system, and each terminal may be fixed or mobile. A terminal may also be called a mobile station, user equipment, a user device, an access terminal, or some other terminology. A terminal may be a wireless device, a cellular phone, a personal digital assistant (PDA), a wireless modem card, and so on. Each terminal 120 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points to one access terminal. Reverse link data communication may occur from one access terminal to one or more access points.

The data to be transmitted to access terminal 120 can be received by access network controller 130. Thereafter, access network controller 130 may send the data to all access points in the access terminal 120 active set. Alternatively, access network controller 130 may first determine which access point was selected by the access terminal 120 as the serving access point, and then send the data to the serving access point. The data can be stored in a queue at the access point(s). A paging message may then be sent by one or more access points to access terminal 120 on respective control channels. Access terminal 120 demodulates and decodes the signals on one or more control channels to obtain the paging messages.

Multiple access communication systems often allocate specific resources to different access terminal in the system. The assignments may have certain persistence, meaning that the assignments may apply to the access terminal over a period of time. Such assignments may be referred to herein as "sticky," or "normal," assignments. Often, certain messages need to be sent over a limited timeframe, for example, as compared with the persistence of "sticky" assignments. Such messages may be transmitted using "time-limited," or "non-sticky," assignments. Messages sent using non-sticky assignments may be broadcast to all users, or they may be messages to specific users. When communication resources (e.g. frequencies, tones, symbols, frames, etc.) are highly occupied by persistent sticky assignments, it can be difficult to find resources and/or space to provide non-sticky assignments for messages. According to one approach, sticky-assigned resources may be deassigned, and time-limited non-sticky assignments may be provided for messages, and then resources may be re-assigned using sticky assignments after the non-sticky assignment is complete. Alternatively, another approach may involve waiting for sticky assignments to expire, and then providing non-sticky assignments for messages. However, signaling overhead required to manage assignments in this way can be large and complex, increasing computational overhead and power consumption. Accordingly, various aspects described herein related to transmitting a broadcast assignment to a plurality of access terminals, wherein the broadcast assignment may be indicated by a media access channel (MAC) ID. An access terminal may receive for instance, a paging signal, an overhead signal, a configuration message, or the like with the broadcast assignment message.

Figure 2:
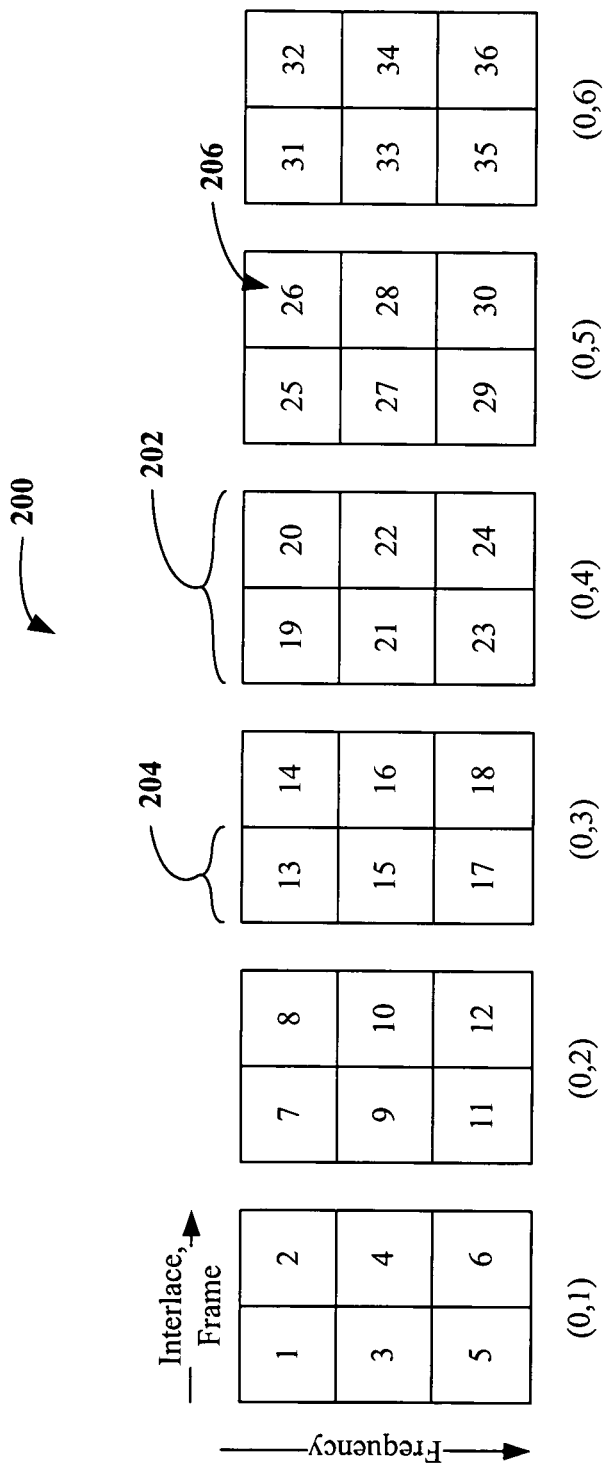
FIG. 2 illustrates a series of transmission frames comprising a plurality of symbols, each of which comprises a plurality of tones, which may be subject to sticky assignments, in accordance with various aspects described herein.

FIG. 2 illustrates a series of transmission frames 200 comprising a plurality of symbols, each of which comprises a plurality of tones, which may be subject to sticky assignments, in accordance with various aspects described herein. For example, the series of frames 200 may comprise 6 individual frames 202, as illustrated. However, it will be appreciated that any number of frames may be comprised by series 200. Additionally, each frame 202 may comprise one or more symbols 204 (e.g., two symbols are shown in each frame 202, although more may be included in each frame), each of which may further comprise one or more tones 206, or frequencies (e.g., 3 tones are shown in each symbol, although symbols may comprise any desired number of tones). For instance, a first symbol in frame 202 comprises three tones labeled 19, 21, and 23, while a second symbol in the frame 202 comprises tones 20, 22, and 24. Any or all of the tones in the frames 202 may be assigned to an access terminal (e.g., a cellular phone, a PDA, a smartphone, or any other suitable access terminal) for communicating with an access point in a wireless communication environment. According to various aspects, one or more of the tones, symbols, frames, etc., may require non-sticky assignment to another access terminal for a brief duration to permit a message to be broadcast to and/or from the other access terminal. In such a scenario, various approaches may be implemented to facilitate non-sticky assignment without requiring a deassignment of the conflicted resources and while minimizing assignment signaling. Non-sticky assignments may be employed to temporarily assign resources to an access terminal for short time periods in order to permit transmission/reception of information streams associated with, for instance, SMS messages, text messages, voice information, video data, audio data, meta data (e.g., data that describes other data), advertisement information, paging signals, device control messages, multicast messages, location-based information (e.g., severe weather warnings, proximity to local attraction information, etc.) and/or any other suitable type of broadcast message.

Figure 3:
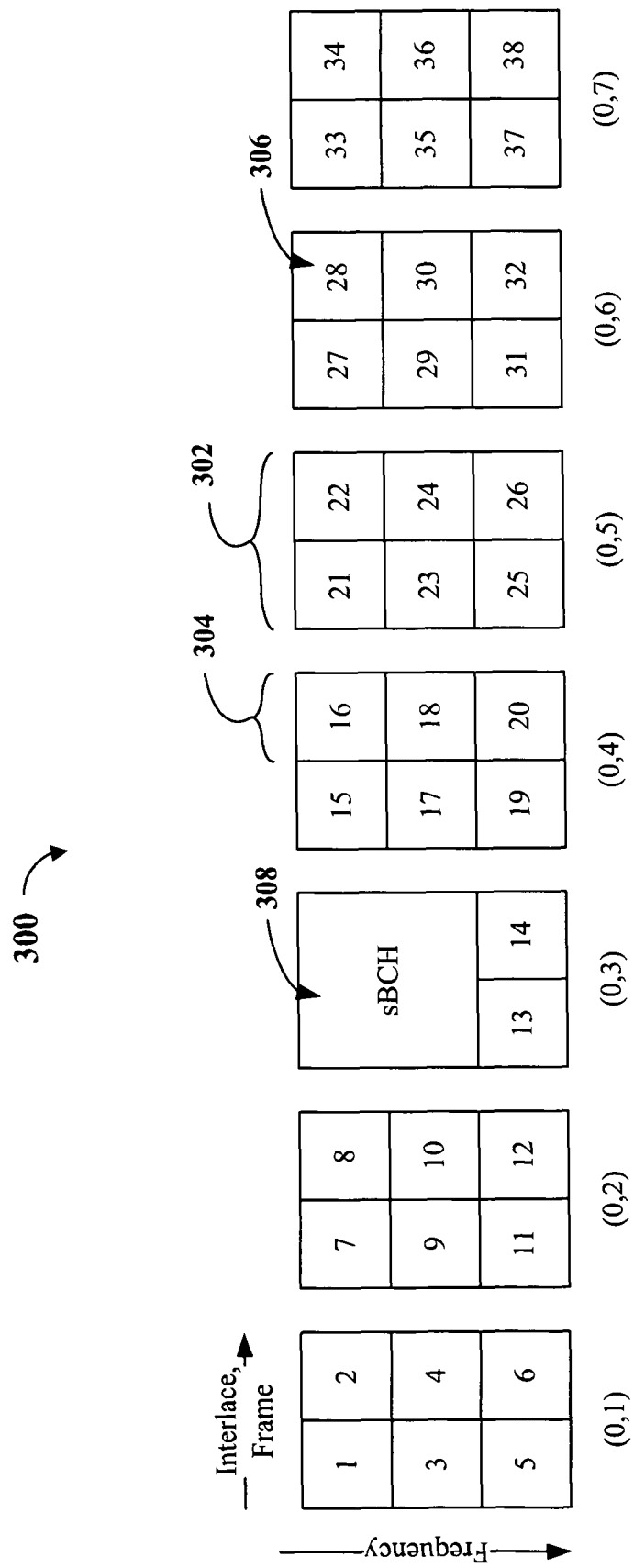
FIG. 3 illustrates a series of transmission frames comprising a plurality of resources that may be subject to a sticky assignment and a conflicting non-sticky assignment, in accordance with various aspects.

FIG. 3 illustrates a series of transmission frames 300 comprising a plurality of resources that may be subject to a sticky assignment and a conflicting non-sticky assignment, in accordance with various aspects. The series of transmission frames 300 comprises a plurality of individual frames 302, each of which comprises one or more symbols 304. Symbols 304 may each comprise one or more tones 306 (e.g., frequencies, sub-carriers, etc.). Although FIG. 3 depicts seven frames each comprising two symbols of three tones, it will be appreciated that any number of frames comprising any number of symbols, further comprising any number of tones, may be utilized in conjunction with the various aspects described herein. Moreover, it will be appreciated that any and/or all of the subcarrier blocks 306 may be, for example, hybrid automatic repeat request (HARQ) retransmissions of one or more data packets. A non-sticky assignment 308 (labeled sBCH, as a shared broadcast signaling channel) is depicted as being inserted in a third frame of the series 300, spanning two symbols in time and two tones in frequency. According to various aspects, resources may be provided for non-sticky messages that have a minor impact on existing sticky assignments and avoid excess signaling for managing such assignments. For example, existing systems either deassign sticky-assigned resources to make room for non-sticky messages or wait until the sticky assignments expire. According to various aspects presented herein, a resource allocation unit (e.g., in a base station or access point), may provide a time-limited non-sticky assignment that may conflict with existing sticky assignments. When this occurs, access terminals associated with the sticky assignments may be informed of the non-sticky assignment and may modify the processing of their sticky-assigned channel(s) in a deterministic way for the duration of the non-sticky assignment.

For example, an access terminal with a sticky assignment may receive an indication of a non-sticky assignment of resources in the sticky assignment (e.g., conflicting resource assignments) and may temporarily suspend usage of the sticky assignment (e.g., resources assigned thereby) for the duration of the non-sticky assignment, and then resume usage of the sticky assignment. That is, the sticky-assigned resources that are in conflict may be relinquished for the duration of the non-sticky assignment, and then resumed. When the sticky assignment is resumed, the access terminal may resume processing data on the assigned resources as if there were no time gap (e.g., in a "wraparound" manner), or the user may alternatively process data starting as if data had been continuously transmitted (e.g., using a blanking technique), as described below with regard to FIG. 5. For instance, the wraparound technique is illustrated in FIG. 3, where an access terminal having a sticky assignment of tones 1 through 38 relinquishes control over 4 tone symbols in a third transmission frame, after processing data on a 12th tone, and then resumes processing data on a 13th tone after the non-sticky assignment ends. In this sense, the access terminal treats the interruption by the non-sticky assignment as though it did not occur.

Furthermore, time is only one relevant dimension for resource assignment according to various aspects, and any other suitable dimensions are considered to fall within the scope of various aspects described herein. For example, in an OFDMA system where access terminals are assigned resources in both time and frequency, the existence of a non-sticky assignment can cause wraparound or blanking in both the time and frequency dimensions.

Figure 4:
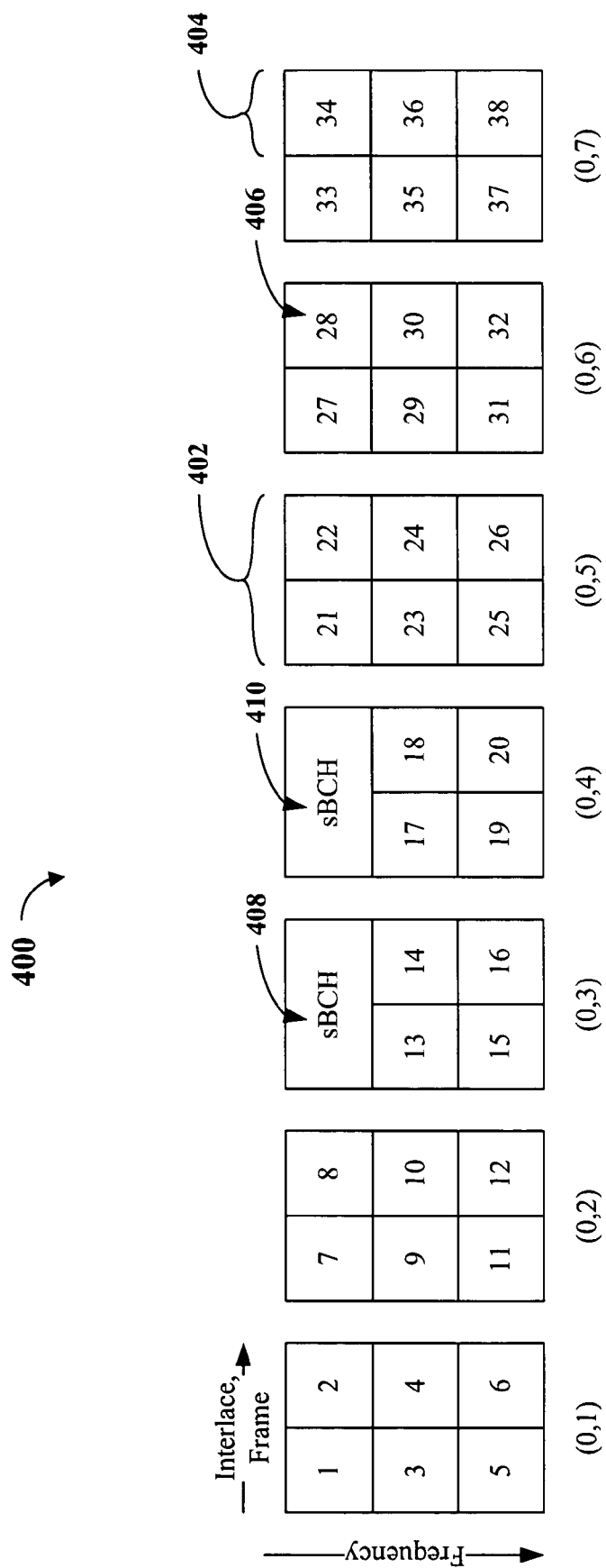
FIG. 4 illustrates a series of transmission frames wherein a non-sticky assignment conflicts with an extant sticky assignment over a plurality transmission frames, in accordance with various aspects.

FIG. 4 illustrates a series of transmission frames 400 wherein a non-sticky assignment conflicts with an extant sticky assignment over a plurality transmission frames, in accordance with various aspects. The series of transmission frames 400 comprises a plurality of individual frames 402, each of which comprises one or more symbols 404. Symbols 404 may each comprise one or more tones 406 (e.g., frequencies, subcarriers, etc.). Although FIG. 4 depicts seven frames each comprising two symbols of three tones, it will be appreciated that any number of frames comprising any number of symbols, further comprising any number of tones, may be utilized in conjunction with the various aspects described herein. A first non-sticky assignment 408 (labeled sBCH, as a broadcast channel) is depicted as being inserted in a third frame of the series 400, spanning two symbols in a time dimension and one tone in a frequency dimension. A second non-sticky assignment 410 similarly spans two symbols in a time dimension and one tone in a frequency dimension, in a fourth transmission frame. It will be appreciated that the non-sticky resource assignments 408 and 410 are not limited to a size of two tone-symbols, but rather can be any number of tone-symbols, and need not be of equal size. Moreover, non-sticky assignments need not be contiguous in time or frequency.

Non-sticky assignments 408 and 410 impact fewer subcarriers, but more OFDM symbols, than non-sticky assignment 308. Additionally, the non-sticky assignments may impact more than one sticky assignment, in which case users of all impacted assignments may adjust respective channel processing accordingly. Furthermore, modifications to the sticky assignments given the impact of the non-sticky assignments may be beneficial to the sticky assignment, and may thus be employed. For example, a duration of the sticky assignment could be lengthened by some amount based on the existence of the time-limited assignment, as illustrated by the seventh transmission frame in FIGS. 3 and 4. According to other aspects, all access terminals that are impacted by the existence of non-sticky assignment(s) may be informed of such assignment(s). In this manner, non-sticky assignments may be provided for certain messages to be transmitted over a communications network while minimally impacting sticky assignments that may conflict with the non-sticky assignments, thus reducing the amount of signaling resources required to provide assignments for the non-sticky messages.

Figure 5:
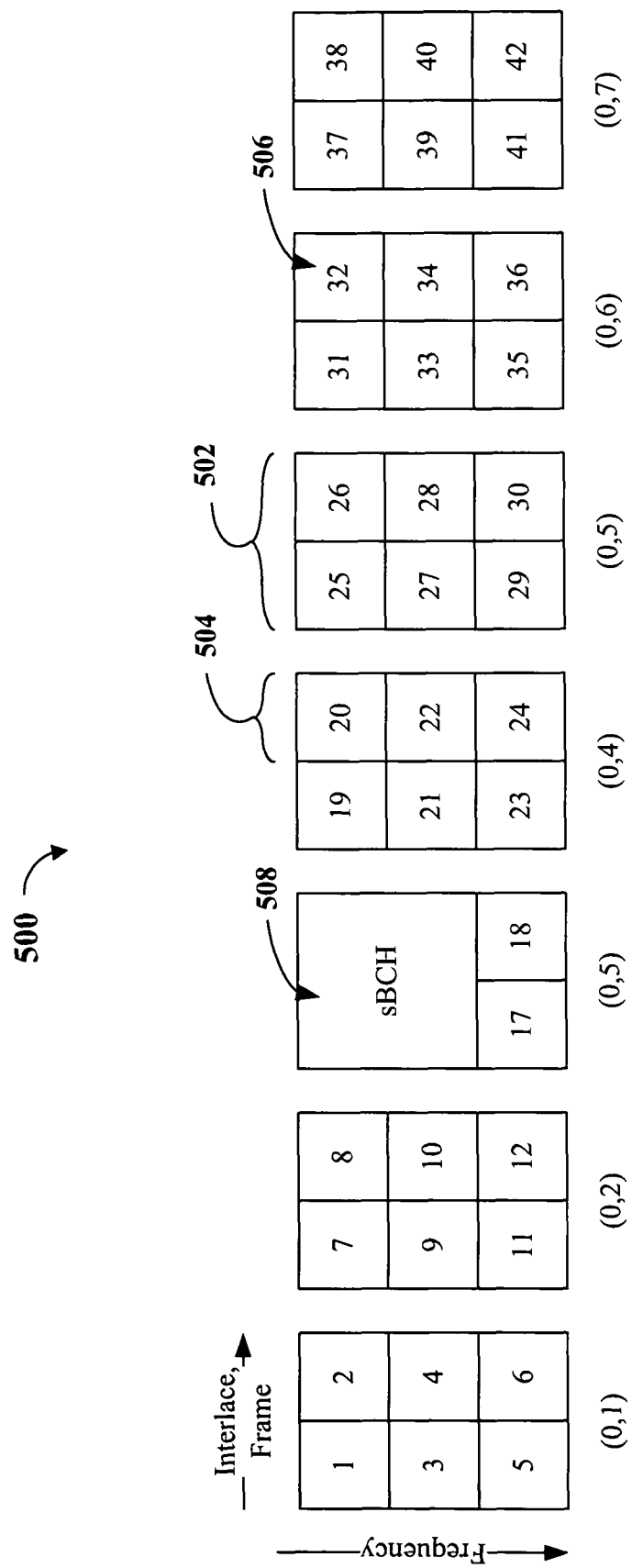
FIG. 5 is an illustration of a series of transmission frames wherein a blanking protocol is implemented to resume sticky-assigned resources after expiration of a conflicting non-sticky assignment, in accordance with one o more aspects.

FIG. 5 illustrates a series of transmission frames 500 comprising a plurality of resources that may be subject to a sticky assignment and a conflicting non-sticky assignment, in accordance with various aspects. The series of transmission frames 500 comprises a plurality of individual frames 502, each of which comprises one or more symbols 504. Symbols 504 may each comprise one or more tones 506 (e.g., frequencies, subcarriers, etc.). Although FIG. 5 depicts seven frames each comprising two symbols of three tones, it will be appreciated that any number of frames comprising any number of symbols, further comprising any number of tones, may be utilized in conjunction with the various aspects described herein. A non-sticky assignment 508 (labeled sBCH, as a shared broadcast signaling channel) is depicted as being inserted in a third frame of the series 500, spanning two symbols in time and two tones in frequency. According to various aspects, resources may be provided for non-sticky messages that have a minor impact on existing sticky assignments and avoid excess signaling for managing such assignments. For example, existing systems either deassign sticky-assigned resources to make room for non-sticky messages or wait until the sticky assignments expire. According to various aspects presented herein, a resource allocation unit (e.g., in a base station or access point), may provide a time-limited non-sticky assignment that may conflict with existing sticky assignments. When this occurs, access terminals associated with the sticky assignments may be informed of the non-sticky assignment and may modify the processing of their sticky-assigned channel(s) in a deterministic way for the duration of the non-sticky assignment.

For example, an access terminal with a sticky assignment may receive an indication of a non-sticky assignment of resources in the sticky assignment (e.g., conflicting resource assignments) and may temporarily suspend usage of the sticky assignment (e.g., resources assigned thereby) for the duration of the non-sticky assignment, and then resume usage of the sticky assignment. That is, the sticky-assigned resources that are in conflict may be relinquished for the duration of the non-sticky assignment, and then resumed. When the sticky assignment is resumed, the access terminal may resume processing data on the assigned resources as if data had been continuously transmitted (e.g., using a blanking technique). For instance, the blanking technique is illustrated in FIG. 5, where an access terminal having a sticky assignment of tones 1 through 42 relinquishes control over 4 tone symbols in a third transmission frame, after processing data on a 12th tone, and then resumes processing data on a 17th tone after the non-sticky assignment ends. Thus, the access terminal "blanks out" the conflicted resources and resumes on subsequent, non-conflicted resources.

Furthermore, time is only one relevant dimension for resource assignment according to various aspects, and any other suitable dimensions are considered to fall within the scope of various aspects described herein. For example, in an OFDMA system where access terminals are assigned resources in both time and frequency, the existence of a non-sticky assignment can cause wraparound or blanking in both the time and frequency dimensions.

Figure 6:
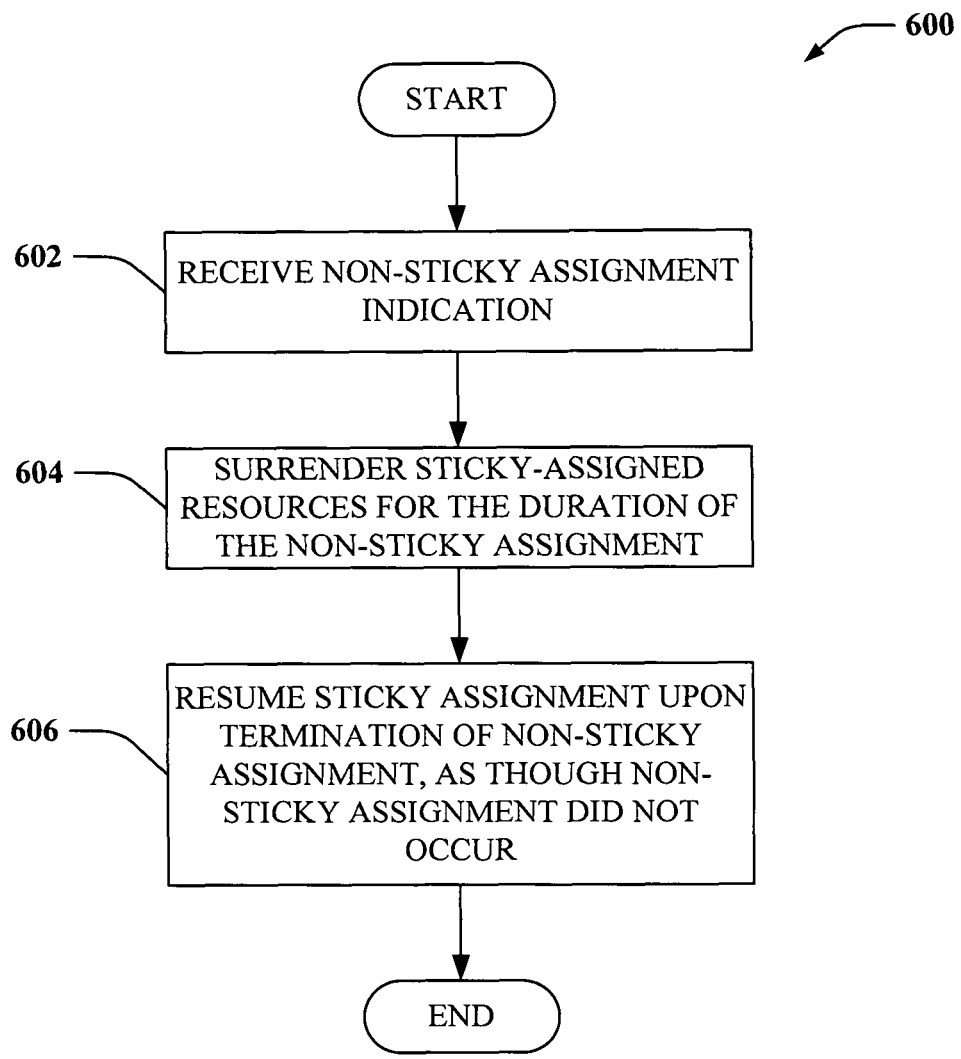
FIG. 6 is an illustration of a method of providing non-sticky assignment indications to an access terminal with a conflicting sticky resource assignment using a wraparound sticky assignment resumption technique to reduce signaling requirements associated therewith, in accordance with one or more aspects.
Figure 7:
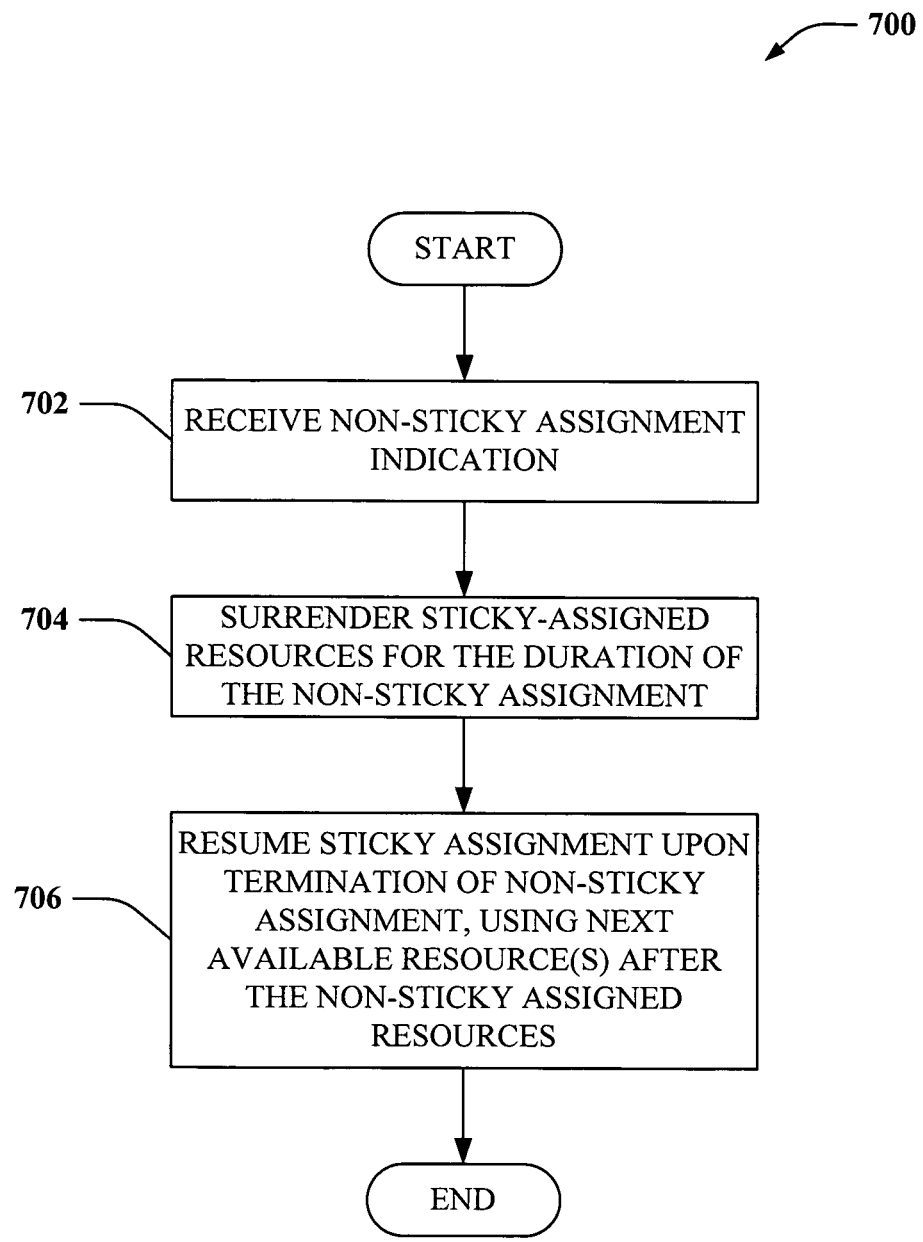
FIG. 7 illustrates a method of providing non-sticky assignment indications to an access terminal with a conflicting sticky resource assignment using a "blanking" sticky assignment resumption technique to reduce signaling requirements associated therewith, in accordance with one or more aspects.

Referring to FIGS. 6-7, methodologies relating to permitting resolution of resource assignment conflicts between access terminals in a wireless communication environment are illustrated. For example, methodologies can relate to resolving conflicting resource assignments in an FDMA environment, an OFDMA environment, a CDMA environment, a WCDMA environment, a TDMA environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

FIG. 6 is an illustration of a method 600 of providing non-sticky assignment indications to an access terminal with a conflicting sticky resource assignment using a wraparound sticky assignment resumption technique to reduce signaling requirements associated therewith, in accordance with one or more aspects. According to the method, at 602, a first access terminal may receive an indication of a non-sticky, or "time-limited," assignment of resources to a second access terminal, where one or more of the resources assigned in the non-sticky assignment to the second user device are already assigned to the first access terminal via a sticky resource assignment. Such duplicate resource assignments result in "conflicted " resources. The indication of the non-sticky assignment may comprise information related to the time-limitation or duration of the non-sticky assignment. At 604, the first access terminal may relinquish control over the conflicted resources for the duration of the non-sticky assignment thereof. Because the first access terminal has information related to the duration of the non-sticky assignment, the first access terminal may resume processing on the sticky assigned resources as though the non-sticky assignment did not occur, at 606.

For example, a non-sticky assignment indication may be received at the first access terminal, which indicates a 6-tone-symbol resource block is in conflict with a sticky assignment for the first access terminal, such as a non-stick assignment of tone symbols 8-13 in an n-tone-symbols assignment, where in n is an integer. In accordance with the wraparound resource resumption technique, the first access terminal may transmit/receive information on tone-symbols 1-7 as normal, relinquish control of tone-symbols 8-13 at the appropriate time, push its own transmitting/receiving schedule for tone symbol 8 to a next resource after the non-sticky assignment, and resume processing (e.g., transmitting/receiving) on the next available resource. In this manner, the first access terminal may employ a wraparound sticky assignment resumption technique to minimize an impact of a non-sticky assignment of conflicted resources to another access terminal.

According to related aspects, the access terminal may receive a signal that instructs the terminal to enable or disable the wraparound protocol. The determination to enable or disable the wraparound protocol may be based on, for example, a dynamic parameter associated with each assignment and/or on a static, system-wide parameter. For instance, a dynamic parameter may be correlated to a ratio of conflicted resources to total resources assigned to the access terminal, such that if the number of conflicted resources is greater than a predetermined threshold value, then the access terminal may enable the wraparound protocol to ensure that the terminal has sufficient resources to continue communication after the expiration of the non-sticky assignment. Additionally or alternatively, if the number of conflicted resources is at or below the predetermined threshold, then the terminal may disable the wraparound protocol because it has sufficient resources to resume communication after the expiration of the non-sticky assignment. An example of a static system-wide parameter may be a predetermined threshold value associated with a number of conflicted resources, wherein the threshold value applies to all access terminals regardless of any ratio of conflicted resources to total assigned resources, etc.

FIG. 7 illustrates a method 700 of providing non-sticky assignment indications to an access terminal with a conflicting sticky resource assignment using a "blanking" sticky assignment resumption technique to reduce signaling requirements associated therewith, in accordance with one or more aspects. According to the method, at 702, a first access terminal may receive an indication of a non-sticky assignment of resources to a second access terminal, where one or more of the resources assigned in the non-sticky assignment to the second access terminal are already assigned to the first user device via a sticky resource assignment. The indication of the non-sticky assignment may comprise information related to the time-limitation or duration of the non-sticky assignment. At 704, the first access terminal may relinquish control over the conflicted resources for the duration of the non-sticky assignment thereof. At 706, the first access terminal may resume its sticky assignment upon termination of the non-sticky assignment, on a next available resource.

For instance, a non-sticky assignment indication may be received at the first access terminal, which indicates a 9-tone-symbol resource block is in conflict with a sticky assignment for the first access terminal, such as a non-sticky assignment of tone symbols 21-29 in an n-tone-symbol assignment, where in n is an integer. In accordance with the "blanking" resource resumption technique, the first access terminal may transmit/receive information on tone-symbols 1-19 as normal, relinquish control of tone-symbols 21-29 at the appropriate time, and resume processing (e.g., transmitting/receiving) on tone-symbol 30. According to a related aspect, the sticky assignment for the first access terminal may be expanded and/or extended by a predetermined amount to mitigate any impact on the first access terminal's resource allocation. For instance, according to the above example, if n=40, then the sticky assignment may be expanded to comprise 49 or more tone-symbols, etc. In this manner, the first access terminal may employ a "blanking" sticky assignment resumption technique to minimize an impact of a non-sticky assignment of conflicted resources to another access terminal. It will be appreciated that any number of access terminals may be impacted by a non-sticky assignment to another access terminal, and all impacted access terminals may adjust their sticky assignment processing schedules accordingly.

According to related aspects, the access terminal may receive a signal that instructs the terminal to enable or disable the blanking protocol. The determination to enable or disable the wraparound protocol may be based on, for example, a dynamic parameter associated with each assignment and/or on a static, system-wide parameter. For instance, a dynamic parameter may be correlated to a ratio of conflicted resources to total resources assigned to the access terminal, such that if the number of conflicted resources is less than a predetermined threshold value, then the access terminal may enable the blanking protocol because the terminal has sufficient resources (e.g., even without the conflicted resources) to continue communication after the expiration of the non-sticky assignment. Additionally or alternatively, if the number of conflicted resources is at or above the predetermined threshold, then the terminal may disable the blanking protocol because it has insufficient resources to resume communication after the expiration of the non-sticky assignment. An example of a static system-wide parameter may be a predetermined threshold value associated with a number of conflicted resources, wherein the threshold value applies to all access terminals regardless of any ratio of conflicted resources to total assigned resources, etc.

Figure 8:
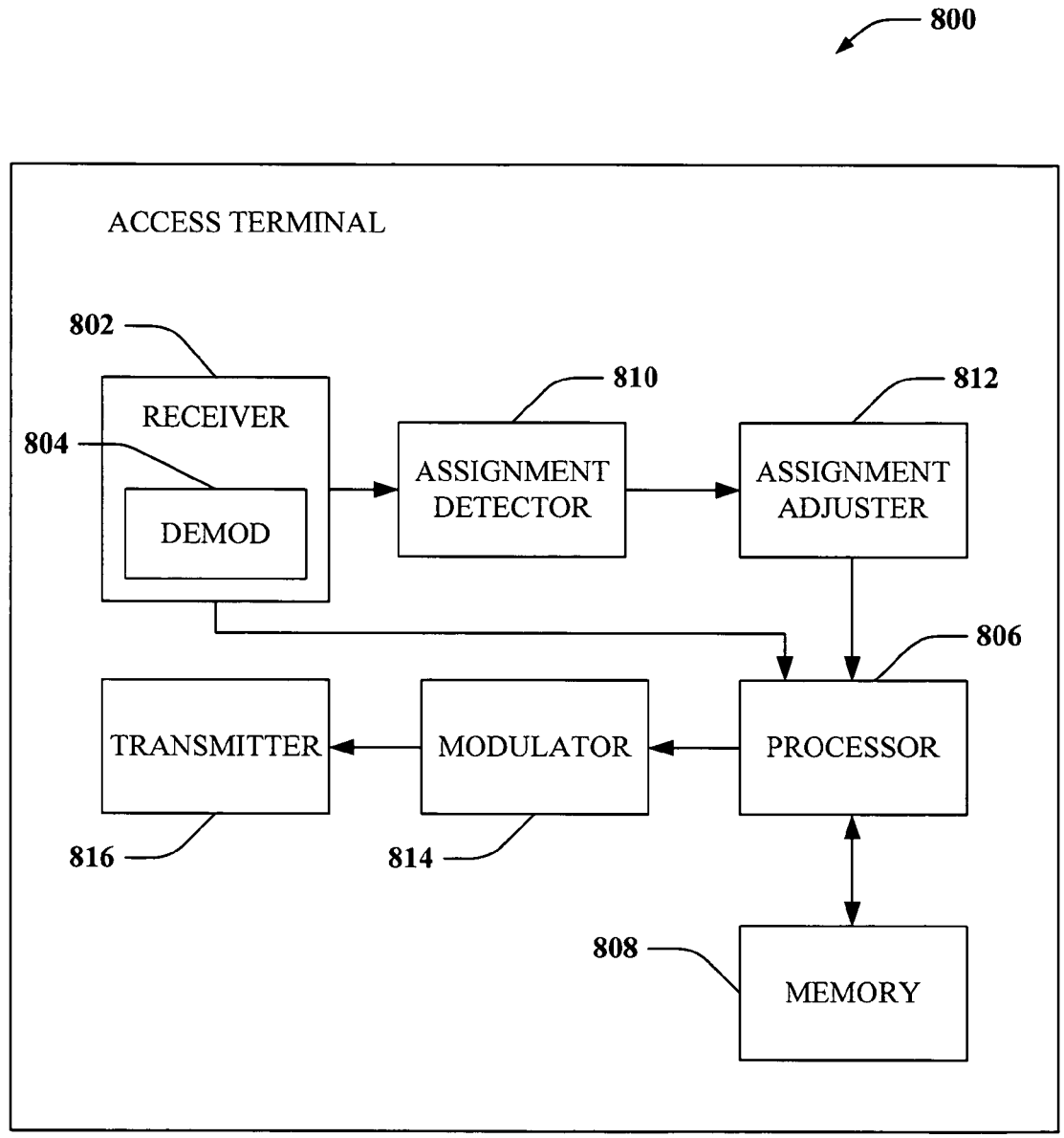
FIG. 8 is an illustration of an access terminal that facilitates performing resource assignment resolution when two or more resource assignments are in conflict, in accordance with one or more aspects.

FIG. 8 is an illustration of an access terminal 800 that facilitates performing resource assignment resolution when two or more resource assignments are in conflict, in accordance with one or more aspects. Access terminal 800 comprises a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of access terminal 800, and/or a processor that both analyzes information received by receiver 802, generates information for transmission by transmitter 816, and controls one or more components of access terminal 800.

Access terminal 800 can additionally comprise memory 808 that is operatively coupled to processor 806 and that may store data to be transmitted, received data, and the like. Memory 808 may store information related to sticky assignments for access terminal 800, non-sticky assignments therefor, non-sticky assignments with conflicting resource assignments for other access terminals, protocols for temporarily relinquishing control over conflicted resources and resuming the conflicted resources after the conflict has been resolved, etc.

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Receiver 802 is further operatively coupled to an assignment detector 810, which may detect resource assignments for the access terminal as well as non-sticky assignment indications related to non-sticky assignments of resources to other access terminals. For instance, assignment detector 810 may receive a sticky assignment of a first set of resources (e.g., frequencies, subcarriers, tones, transmission time periods, channels, etc.) and may exert control over such resources. Assignment detector may then detect a non-sticky assignment indicator signal that indicates that one or more of the resources assigned to the access terminal have been temporarily assigned to another access terminal. In this case, an assignment adjustor 812 may relinquish control over the conflicted resource(s) to adjust the access terminal's assigned set of resources, and may reassume control over the resource(s) upon expiration of the non-sticky assignment of the conflicted resource to the other access terminal. The assignment detector 810 and the assignment adjustor 812 may utilize a wraparound or blanking protocol to resolve conflicted resources, as detailed above.

Access terminal 800 still further comprises a modulator 814 and a transmitter 816 that transmits the signal to, for instance, a base station, another user device, a remote agent, etc. Although depicted as being separate from the processor 806, it is to be appreciated that assignment detector 810 and the assignment adjustor 812 may be part of processor 806 or a number of processors (not shown).

Figure 9:
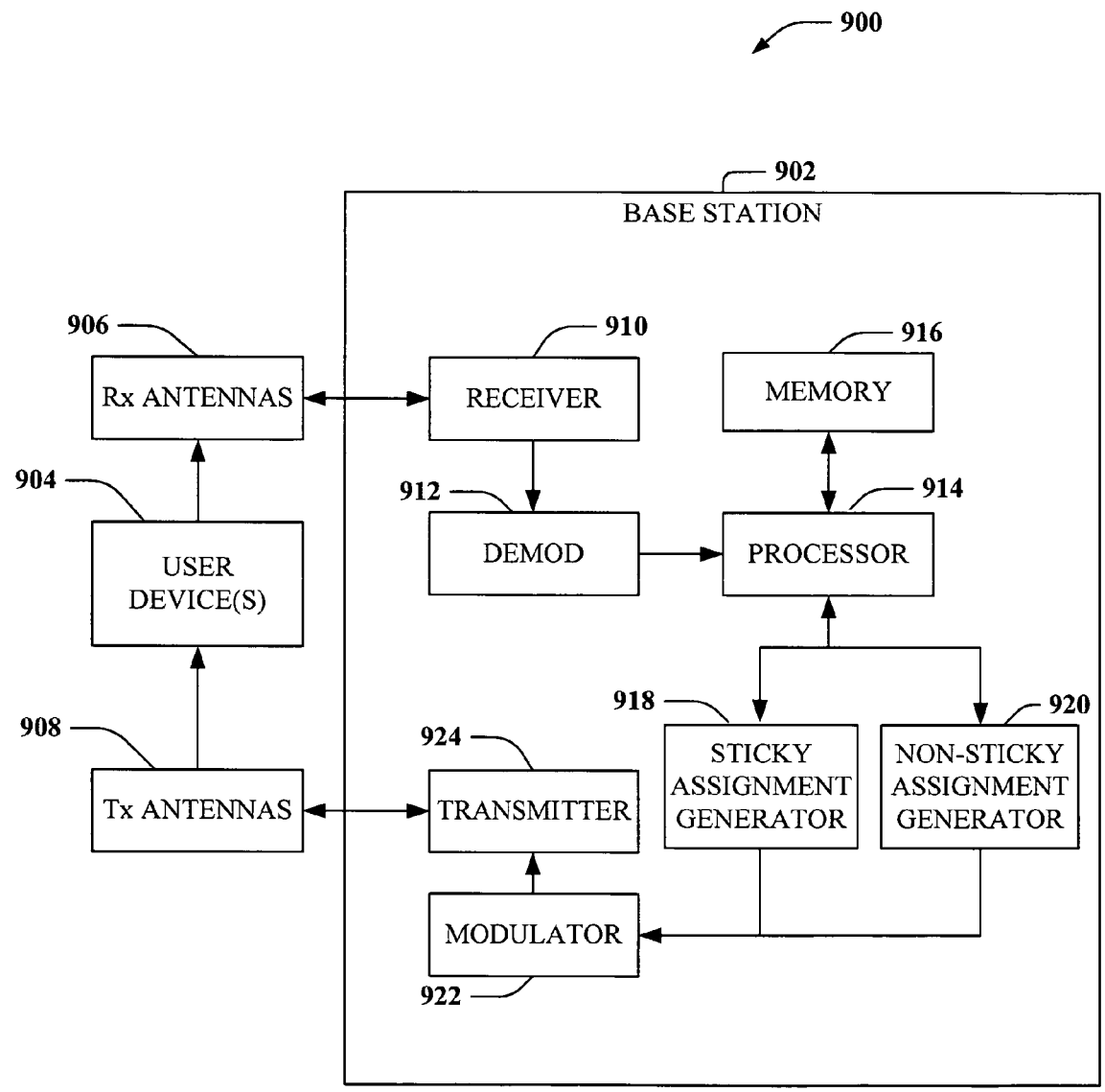
FIG. 9 is an illustration of a system that provides non-sticky resource assignments with predefined expiration times to an access terminal to facilitate resource assignment conflict resolution while minimizing assignment signaling, in accordance with one or more aspects.

FIG. 9 is an illustration of a system 900 that provides non-sticky resource assignments with predefined expiration times to an access terminal to facilitate resource assignment conflict resolution while minimizing assignment signaling, in accordance with one or more aspects. System 900 comprises a base station 902 with a receiver 910 that receives signal(s) from one or more user devices 904 through a plurality of receive antennas 906, and a transmitter 924 that transmits to the one or more user devices 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 7, and which is coupled to a memory 916 that stores information related to allocating resources associated with reverse link communication, assignments of resources, which may be sticky or non-sticky, and/or any other suitable information related to performing the various actions and functions set forth herein.

Processor 914 may be further coupled to a sticky assignment generator 908 and a non-sticky assignment generator 920, which may facilitate providing assignment indicators to one or more user devices 904. For example, sticky assignment generator may generate a sticky assignment of resources for a given user device 904, which may be transmitted by transmitter 924 to assign the resources to the user device. In the event that another user device requires one or more of the sticky-assigned resources, non-sticky assignment generator 920 may generate an indication of the conflicted resource(s) for transmission to the user device 904. The non-sticky assignment may comprise information related to the identity of the conflicted resource(s) as well as a duration of the non-sticky assignment, which in turn may permit user device 904 to relinquish control over the conflicted resource(s) for the specified period and then resume control there over upon the termination of the non-sticky assignment. In this manner, only one assignment signal is needed to inform the user device 904 of the conflict and for conflict resolution, as compared with at least two signals in a system that employs express or implicit deassignment protocols, etc. Sticky assignment generator 918 and non-sticky assignment generator 920 may be further coupled to a modulator 922. Modulator 922 may multiplex assignment information for transmission by a transmitter 924 through antenna 908 to user device(s) 904. Although depicted as being separate from processor 914, it is to be appreciated that sticky assignment generator 918, non-sticky assignment generator 920, and/or modulator 922 may be part of processor 914 or a number of processors (not shown).

Figure 10:
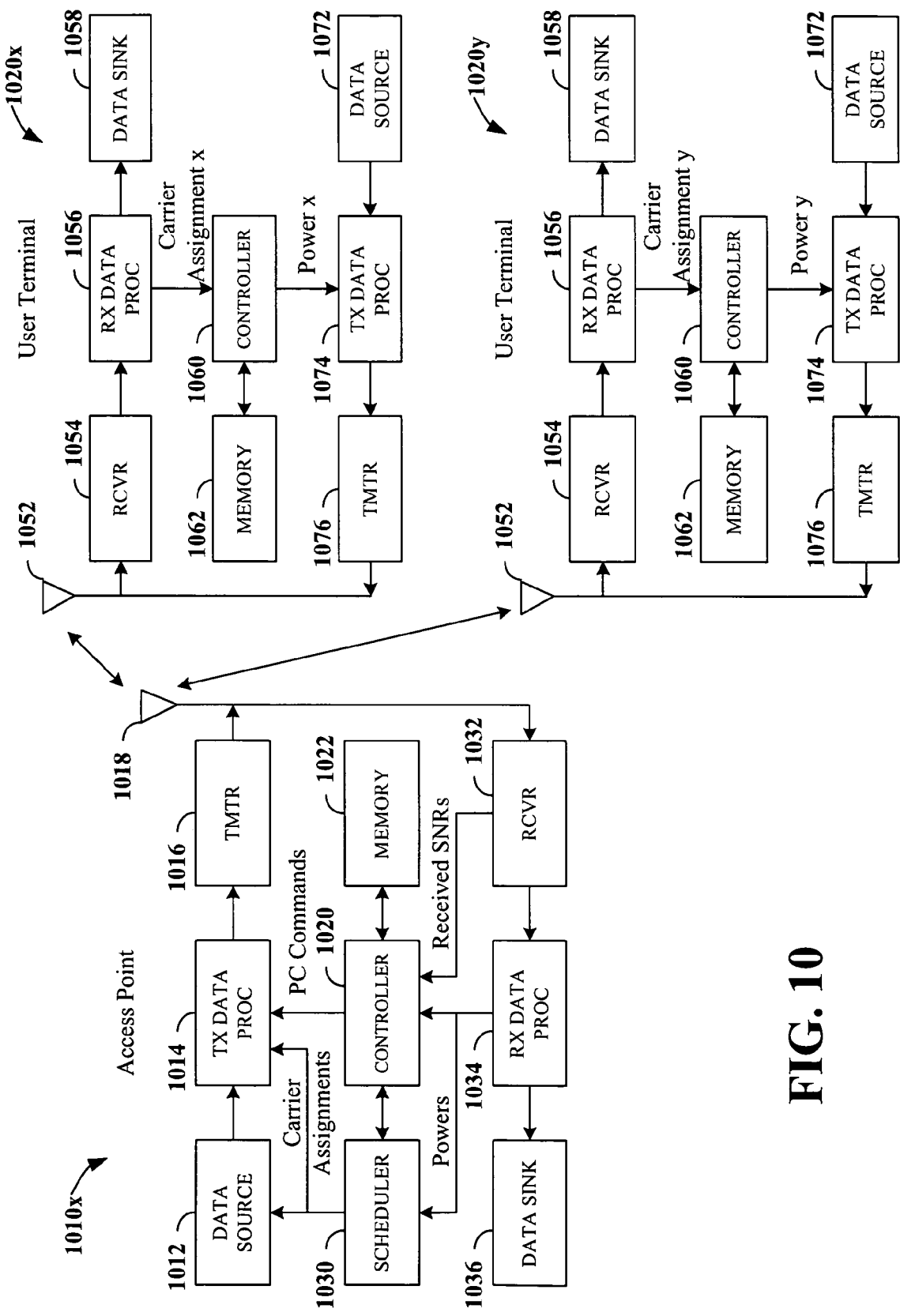
FIG. 10 is an illustration of a wireless network environment that can be employed in conjunction with the various systems and methods described herein.

FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-5, 8, 9, and 11) and/or methods (FIGS. 6-7) described herein to facilitate wireless communication there between.

FIG. 10 shows a block diagram of an embodiment of an AP 1010x and two ATs 1020x and 1020y in multiple-access multi-carrier communication system. At AP 1010x, a transmit (TX) data processor 1014 receives traffic data (i.e., information bits) from a data source 1012 and signaling and other information from a controller 1020 and a scheduler 1030. For example, controller 1020 may provide power control (PC) commands that are used to adjust the transmit power of the active ATs, and scheduler 1030 may provide assignments of carriers for the ATs. These various types of data may be sent on different transport channels. TX data processor 1014 encodes and modulates the received data using multi-carrier modulation (e.g., OFDM) to provide modulated data (e.g., OFDM symbols). A transmitter unit (TMTR) 1016 then processes the modulated data to generate a downlink-modulated signal that is then transmitted from an antenna 1018.

At each of ATs 1020x and 1020y, the transmitted and modulated signal is received by an antenna 1052 and provided to a receiver unit (RCVR) 1054. Receiver unit 1054 processes and digitizes the received signal to provide samples. A received (RX) data processor 1056 then demodulates and decodes the samples to provide decoded data, which may include recovered traffic data, messages, signaling, and so on. The traffic data may be provided to a data sink 1058, and the carrier assignment and PC commands sent for the terminal are provided to a controller 1060. Controller 1060 may be configured to carryout the schemes describe above.

For each active terminal 1020, a TX data processor 1074 receives traffic data from a data source 1072 and signaling and other information from controller 1060. For example, controller 1060 may provide information indicative of the required transmit power, the maximum transmit power, or the difference between the maximum and required transmit powers for the terminal. The various types of data are coded and modulated by TX data processor 1074 using the assigned carriers and further processed by a transmitter unit 1076 to generate an uplink modulated signal that is then transmitted from antenna 1052.

At AP 1010x, the transmitted and modulated signals from the ATs are received by antenna 1018, processed by a receiver unit 1032, and demodulated and decoded by an RX data processor 1034. Receiver unit 1032 may estimate the received signal quality (e.g., the received signal-to-noise ratio (SNR)) for each terminal and provide this information to controller 1020. Controller 1020 may then derive the PC commands for each terminal such that the received signal quality for the terminal is maintained within an acceptable range. RX data processor 1034 provides the recovered feedback information (e.g., the required transmit power) for each terminal to controller 1020 and scheduler 1030.

The techniques described herein may be implemented by various means. For example, these techniques may be implemented in hardware, software, or a combination thereof. For a hardware implementation, the processing units (e.g., controllers 1020 and 1070, TX and RX processors 1014 and 1034, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

Figure 11:
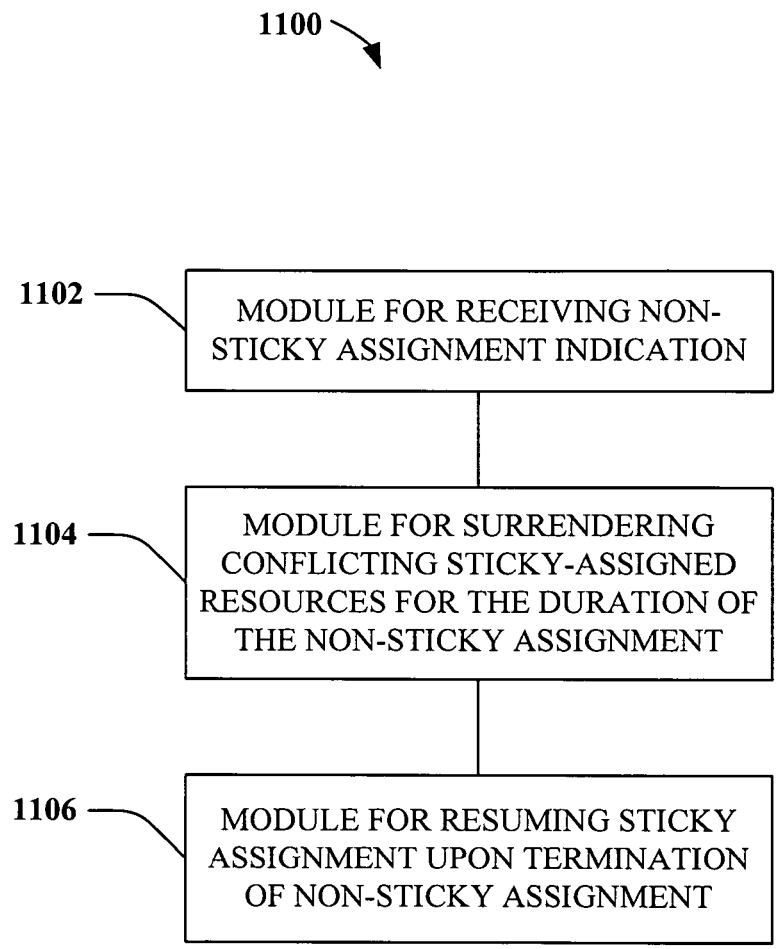
FIG. 11 illustrates an apparatus that facilitates resolving resource assignment conflicts between access terminals in a wireless communication environment, in accordance with various aspects

FIG. 11 illustrates an apparatus 1100 that facilitates resolving resource assignment conflicts between access terminals in a wireless communication environment, in accordance with various aspects. Apparatus 1100 is represented as a series of interrelated functional blocks, or "modules," which can represent functions implemented by a processor, software, or combination thereof (e.g., firmware). For example, apparatus 1100 may provide modules for performing various acts such as are described above with regard to the preceding figures. Apparatus 1100 comprises a module for receiving a non-sticky assignment indication 1102. Module for receiving a non-sticky assignment indication 1102 may analyze the received indication and determine whether any resources included in the non-sticky assignment, as described by the non-sticky assignment indication, conflict with any resources assigned to the access terminal in a previous sticky assignment. If so, a module for surrendering sticky-assigned resources 1104 may relinquish control over the sticky-assigned resources for the duration for the non-sticky assignment. Upon the expiration of the non-sticky assignment of the conflicted resource(s), a module for resuming the sticky-assigned resource(s) 1106 may re-exert control over the conflicted resource. In this manner, apparatus 1100 and the various modules comprised thereby may carryout the methods described above and/or may impart any necessary functionality to the various systems described herein.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of resolving resource assignment conflicts between access terminals in a wireless communication environment, comprising:
    receiving, at a first access terminal, an indication of a non-sticky assignment of resources to at least a second access terminal, the non-sticky assignment comprising at least one conflicted resource that is also assigned to the first access terminal via a sticky assignment;
    surrendering the conflicted resource at the first access terminal for a predetermined time period; and
    resuming the at least one conflicted resource after the predetermined time period has expired.

2. The method of claim 1, wherein a signal comprising a non-sticky assignment indication also comprises information associated with a duration of the non-sticky assignment.

3. The method of claim 1, further comprising employing a wraparound protocol to resume the at least one conflicted resource as though the non-sticky assignment did not occur.

4. The method of claim 3, further comprising receiving a signal that enables or disables the wraparound protocol, wherein the signal is based at least in part on at least one of a dynamic per-assignment parameter and a static system-wide parameter.

5. The method of claim 1, further comprising employing a blanking protocol to resume at least one conflicted resource on a next logical resource after the non-sticky assignment has expired.

6. The method of claim 5, further comprising receiving a signal that enables or disables the blanking protocol, wherein the signal is based at least in part on at least one of a dynamic per-assignment parameter and a static system-wide parameter.

7. The method of claim 1, wherein the at least one conflicted resource is a frequency in a transmission time frame.

8. The method of claim 1, wherein assigned resources are utilized for forward link communication.

9. The method of claim 1, wherein assigned resources are utilized for reverse link communication.

10. The method of claim 1, wherein the non-sticky assignment is a broadcast assignment that is directed to a plurality of access terminals, and wherein the broadcast assignment is indicated by a media access channel (MAC) identification and is utilized to receive at least one of a paging message, an overhead message, and a configuration message.

11. An apparatus that facilitates resolving resource assignment conflicts between access terminals in a wireless communication environment, comprising:
a receiver at a first access terminal that receives a non-sticky assignment indicator signal comprising information related to resources assigned to at least a second access terminal, the non-sticky assignment comprising at least one conflicted resource that is also assigned to the first access terminal via a sticky assignment; and
a processor that relinquishes control over the conflicted resource at the first access terminal for a predetermined time period, and resumes control over the at least one conflicted resource after the predetermined time period has expired.

12. The apparatus of claim 11, wherein the non-sticky assignment indicator signal also comprises information associated with a duration of the non-sticky assignment.

13. The apparatus of claim 11, wherein the processor employs a wraparound protocol to resume the at least one conflicted resource as though the non-sticky assignment did not occur.

14. The apparatus of claim 13, wherein the receiver receives a signal that enables or disables the wraparound protocol, wherein the signal is based at least in part on at least one of a dynamic per-assignment parameter and a static system-wide parameter.

15. The apparatus of claim 11, wherein the processor employs a blanking protocol to resume at least one conflicted resource on a next logical resource after the non-sticky assignment has expired.

16. The apparatus of claim 15, wherein the receiver receives a signal that enables or disables the blanking protocol, wherein the signal is based at least in part on at least one of a dynamic per-assignment parameter and a static system-wide parameter.

17. The apparatus of claim 11, wherein the at least one conflicted resource is a frequency in a transmission time frame.

18. The apparatus of claim 11, wherein assigned resources are utilized for forward link communication.

19. The apparatus of claim 11, wherein assigned resources are utilized for reverse link communication.

20. The apparatus of claim 11, wherein the non-sticky assignment is a broadcast assignment that is directed to a plurality of access terminals, and wherein the broadcast assignment is indicated by a media access channel (MAC) identification and is utilized to receive at least one of a paging message, an overhead message, and a configuration message.

21. An apparatus that facilitates resolving resource assignment conflicts between access terminals in a wireless communication environment, comprising:
means for receiving an indication, at a first access terminal, of a non-sticky assignment of resources to at least a second access terminal, the non-sticky assignment comprising at least one conflicted resource that is also assigned to the first access terminal via a sticky assignment;
means for surrendering the conflicted resource at the first access terminal for a predetermined time period; and
means for resuming the at least one conflicted resource after the predetermined time period has expired.

22. The apparatus of claim 21, wherein a signal comprising a non-sticky assignment indication also comprises information associated with a duration of the non-sticky assignment.

23. The apparatus of claim 21, further comprising means for employing a wraparound protocol to resume the at least one conflicted resource as though the non-sticky assignment did not occur.

24. The apparatus of claim 23, wherein the means for receiving receives a signal that enables or disables the wraparound protocol, wherein the signal is based at least in part on at least one of a dynamic per-assignment parameter and a static system-wide parameter.

25. The apparatus of claim 21, further comprising means for employing a blanking protocol to resume at least one conflicted resource on a next logical resource after the non-sticky assignment has expired.

26. The apparatus of claim 25, wherein the means for receiving receives a signal that enables or disables the blanking protocol, wherein the signal is based at least in part on at least one of a dynamic per-assignment parameter and a static system-wide parameter.

27. The apparatus of claim 21, wherein the at least one conflicted resource is a frequency in a transmission time frame.

28. The apparatus of claim 21, wherein assigned resources are utilized for forward link communication.

29. The apparatus of claim 21, wherein assigned resources are utilized for reverse link communication.

30. The apparatus of claim 21, wherein the non-sticky assignment is a broadcast assignment that is directed to a plurality of access terminals, and wherein the broadcast assignment is indicated by a media access channel (MAC) identification and is utilized to receive at least one of a paging message, an overhead message, and a configuration message.

31. A computer-readable medium having stored thereon computer-executable instructions for:
receiving an indication, at a first access terminal, of a non-sticky assignment of resources to at least a second access terminal, the non-sticky assignment comprising at least one conflicted resource that is also assigned to the first access terminal via a sticky assignment;
relinquishing control of the conflicted resource at the first access terminal for a predetermined time period; and
resuming control of the at least one conflicted resource after the predetermined time period has ended.

32. The computer-readable medium of claim 31, wherein a signal comprising a non-sticky assignment indication also comprises information associated with a duration of the non-sticky assignment.

33. The computer-readable medium of claim 31, further comprising instructions for employing a wraparound protocol to resume the at least one conflicted resource as though the non-sticky assignment did not occur.

34. The computer-readable medium of claim 33, further comprising instructions for receiving a signal that enables or disables the wraparound protocol, wherein the signal is based at least in part on at least one of a dynamic per-assignment parameter and a static system-wide parameter.

35. The computer-readable medium of claim 31, further comprising instructions for employing a blanking protocol to resume at least one conflicted resource on a next logical resource after the non-sticky assignment has expired.

36. The computer-readable medium of claim 35, further comprising instructions for receiving a signal that enables or disables the blanking protocol, wherein the signal is based at least in part on at least one of a dynamic per-assignment parameter and a static system-wide parameter.

37. The computer-readable medium of claim 31, wherein the at least one conflicted resource is a subcarrier frequency.

38. The computer-readable medium of claim 31, wherein assigned resources are utilized for forward link communication.

39. The computer-readable medium of claim 31, wherein assigned resources are utilized for reverse link communication.

40. The computer-readable medium of claim 31, wherein the non-sticky assignment is a broadcast assignment that is directed to a plurality of access terminals, and wherein the broadcast assignment is indicated by a media access channel (MAC) identification and is utilized to receive at least one of a paging message, an overhead message, and a configuration message.

41. A processor that executes computer-executable instructions for resolving conflicts between resource assignments in a wireless communication environment, the instructions comprising:
    receiving an indication, at a first access terminal, of a non-sticky assignment of resources to at least a second access terminal, the non-sticky assignment comprising at least one conflicted resource that is also assigned to the first access terminal via a sticky assignment;
    relinquishing control of the conflicted resource at the first access terminal for a predetermined time period; and
    resuming control of the at least one conflicted resource after the predetermined time period has ended.

42. The processor of claim 41, wherein a signal comprising a non-sticky assignment indication also comprises information associated with a duration of the non-sticky assignment.

43. The processor of claim 41, the instructions further comprising employing a wraparound protocol to resume the at least one conflicted resource as though the non-sticky assignment did not occur.

44. The processor of claim 43, the instructions further comprising receiving a signal that enables or disables the wraparound protocol, wherein the signal is based at least in part on at least one of a dynamic per-assignment parameter and a static system-wide parameter.

45. The processor of claim 41, the instructions further comprising employing a blanking protocol to resume at least one conflicted resource on a next logical resource after the non-sticky assignment has expired.

46. The processor of claim 45, the instructions further comprising receiving a signal that enables or disables the blanking protocol, wherein the signal is based at least in part on at least one of a dynamic per-assignment parameter and a static system-wide parameter.

47. The processor of claim 41, wherein the at least one conflicted resource is a subcarrier frequency.

48. The processor of claim 41, wherein assigned resources are utilized for forward link communication.

49. The processor of claim 41, wherein assigned resources are utilized for reverse link communication.

50. The processor of claim 41, wherein the non-sticky assignment is a broadcast assignment that is directed to a plurality of access terminals, and wherein the broadcast assignment is indicated by a media access channel (MAC) identification and is utilized to receive at least one of a paging message, an overhead message, and a configuration message.

51. The method of claim 1, wherein the received indication indicates, to the first access terminal, that the non-sticky assignment restricts the second access terminal from maintaining the at least one conflicted resource for more than the predetermined period of time.

* * * * *